United States Patent
Liu et al.

(10) Patent No.: US 10,831,344 B2
(45) Date of Patent: Nov. 10, 2020

(54) PAGE POSITIONING METHOD AND APPARATUS FOR ERRONEOUS INPUT INFORMATION

(71) Applicant: Advanced New Technologies Co., Ltd., George Town (KY)

(72) Inventors: Bin Liu, Hangzhou (CN); Junliang Zhang, Hanzghou (CN); Lei Hong, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/027,030

(22) Filed: Jul. 3, 2018

(65) Prior Publication Data

US 2018/0314397 A1    Nov. 1, 2018

Related U.S. Application Data

(63) Continuation of application No. PCT/CN2016/112021, filed on Dec. 26, 2016.

(30) Foreign Application Priority Data

Jan. 4, 2016   (CN) .......................... 2016 1 0004088

(51) Int. Cl.
*G06F 3/0483* (2013.01)
*G06F 9/451* (2018.01)
(Continued)

(52) U.S. Cl.
CPC ............ *G06F 3/0483* (2013.01); *G06F 9/451* (2018.02); *G06F 11/0775* (2013.01); *G06F 40/174* (2020.01); *G06F 40/226* (2020.01)

(58) Field of Classification Search
CPC .................................................... G06F 3/0483
See application file for complete search history.

(56) References Cited

U.S. PATENT DOCUMENTS 7,251,782 B1 *   7/2007   Albers et al. ............. G06F 3/01
7,533,341 B2 *   5/2009   Ko ............................. G06F 3/00
(Continued)

FOREIGN PATENT DOCUMENTS

CN       101192145       6/2008
CN       101470867       7/2009
(Continued)

OTHER PUBLICATIONS

Certificationprep.org [online], "Lesson 9: Completing, Submitting and Validating User Input Forms," Jan. 2014, retrieved on Jul. 16, 2019, retrieved from URL<http://www.certificationprep.org/wp-content/uploads/2016/07/AdvH5C3-09.pdf>, 24 pages.

(Continued)

*Primary Examiner* — James J Debrow
(74) *Attorney, Agent, or Firm* — Fish & Richardson P.C.

(57) ABSTRACT

Input information associated with a data field is received. The data field is included in a page. A determination is made as to whether the input information includes an error. In response to determining that the input information includes an error an anchor is determined in the page corresponding to a location of the data field in the page. An error popup is displayed on the page. The error popup includes an error list that includes an error notification associated with the error. The error notification includes the location of the data field in the page.

9 Claims, 7 Drawing Sheets

(51) Int. Cl.
*G06F 40/174* (2020.01)
*G06F 40/226* (2020.01)
*G06F 11/07* (2006.01)

(56) References Cited

U.S. PATENT DOCUMENTS

| | | | | |
|---|---|---|---|---|
| 8,234,562 | B1* | 7/2012 | Evans et al. | G06F 17/00 |
| 9,317,484 | B1* | 4/2016 | Ho | G06F 17/21 |
| 2003/0103072 | A1 | 6/2003 | Ko | |
| 2004/0210776 | A1* | 10/2004 | Shah et al. | G06F 17/60 |
| 2006/0179408 | A1 | 8/2006 | Ko | |
| 2011/0214067 | A1 | 9/2011 | Tanaka | |
| 2013/0219268 | A1* | 8/2013 | Straten | G06F 17/24 |

FOREIGN PATENT DOCUMENTS

| | | |
|---|---|---|
| CN | 101706771 | 5/2010 |
| CN | 102324004 | 1/2012 |
| CN | 103152365 | 6/2013 |
| CN | 103226488 | 7/2013 |
| CN | 103472983 | 12/2013 |
| CN | 103873436 | 6/2014 |
| CN | 103984547 | 8/2014 |
| CN | 104317580 | 1/2015 |
| JP | 2002063186 | 2/2002 |
| JP | 2002297667 | 10/2002 |
| JP | 2005141408 | 6/2005 |
| JP | 2005259039 | 9/2005 |
| JP | 2011238167 | 11/2011 |
| TW | 201301067 | 1/2013 |

OTHER PUBLICATIONS

Extended European Search Report in European Application No. 16883430.7, dated Jul. 15, 2019, 11 pages.

Medium.com [online], "Form validation best practices," Sep. 2014, retrieved on Jul. 16, 2019, retrieved from URL<https://medium.com/@andrew.burton/form-validation-best-practices-8e3bec7d0549>, 17 pages.

Nakamoto, "Bitcoin: A Peer-to-Peer Electronic Cash System," www.bitcoin.org, 2005, 9 pages.

International Search Report issued by the International Searching Authority in International Application No. PCT/CN2016/112021 dated Apr. 6, 2017; 9 pages.

International Preliminary Report on Patentability in International Application No. PCT/CN2016/112021, dated Jul. 10, 2018, 8 pages (with English Translation).

C# Programming and Application, 1st ed, South China University of Technology, Jul. 2015, pp. 250-251 (with English Abstract).

Design New Power Series Web Design, Southwest China Normal University Press, Sep. 2015, p. 89 (with machine translation).

* cited by examiner

FIG. 7 ical remarks
PAGE POSITIONING METHOD AND APPARATUS FOR ERRONEOUS INPUT INFORMATION This application is a continuation of PCT Application No. PCT/CN2016/112021, filed on Dec. 26, 2016, which claims priority to Chinese Patent Application No. 201610004088.3, filed on Jan. 4, 2016, and each application is hereby incorporated by reference in its entirety.

TECHNICAL FIELD

The present application relates to the field of page positioning technologies, and in particular, to a page positioning method and apparatus for erroneous input information.

BACKGROUND

A frequently-used method for interaction between a front end and a back end is as follows: The front end generates a page and displays the page for a user, where the page can include one or more page input areas, and each page input area corresponds to one field. The user performs an input operation in a corresponding page input area based on a prompt of the field. After completing the input, the user submits the input information on the page to the back end for error check by using a submission control on the page. After performing the error check, the back end returns an error check result to the front end, and the front end determines the erroneous input information on the page based on the error check result and then prompts the user to perform correction.

In the existing technology, a method in which the front end provides a prompt of the erroneous input information on the page is displaying text remarks or symbolic remarks beside the page input area that includes the erroneous input information. When the user sees the remarks, the user can know that the input information beside the remarks is erroneous and needs to be corrected.

However, in actual application, a large number of pages are long pages, and each long page may include many page input areas. In this situation, after the front end provides a prompt of the erroneous input information on the long page, because a display device of the user can display only a part of the long page at a time, the user needs to scroll up or down the long page to identify and correct the erroneous input information that is prompted on the long page. The operations are complex, and the erroneous input information can be easily missed.

SUMMARY

Implementations of the present application provide a page positioning method for erroneous input information and a page positioning apparatus for erroneous input information to resolve a problem. In the existing technology, a user needs to scroll up or down a long page to identify and correct the erroneous input information that is prompted on the long page, which is a tedious operation. Moreover, the erroneous input information can be easily missed.

An implementation of the present application provides a page positioning method for erroneous input information, including the following: submitting input information on a page to a back end for error check; determining erroneous input information on the page based on an error check result returned by the back end; based on the determined erroneous input information, generating and displaying an error prompt popup that includes prompt information for the erroneous input information; and positioning a page based on an anchor that corresponds to a page input area including the erroneous input information.

An implementation of the present application provides a page positioning apparatus for erroneous input information, including the following: a submission module, configured to submit input information on a page to a back end for error check; a determining module, configured to determine erroneous input information on the page based on an error check result returned by the back end; a popup module, configured to generate and display an error prompt popup that includes prompt information for the erroneous input information based on the determined erroneous input information; and a positioning module, configured to position a page based on an anchor that corresponds to a page input area including the erroneous input information.

Based on at least one of the technical solutions in the implementations of the present application, the user can learn that there is erroneous input information on the page by using the error prompt popup. The page can be positioned at the page input area that includes the erroneous input information based on the anchor, so as to help the user correct the erroneous input information. As such, operations of the user can be simplified, and the erroneous input information are less likely to be missed.

BRIEF DESCRIPTION OF DRAWINGS

The accompanying drawings described here are intended to provide a further understanding of the present application and constitute a part of the present application. The illustrative implementations of the present application and descriptions of the implementations are intended to describe the present application and do not constitute limitations on the present application. In the accompanying drawings.

DESCRIPTION OF EMBODIMENTS

To make the objectives, technical solutions, and advantages of the present application clearer, the following describes the technical solutions of the present application with reference to specific implementations of the present application and corresponding accompanying drawings. Apparently, the described implementations are merely some rather than all of the implementations of the present application. Other implementations obtained by a person of ordinary skill in the art based on the implementations of the present application without creative efforts shall fall within the protection scope of the present application.

A front end mentioned in the background and the implementations of the present application can be a front end of a browser, a front end of a client of an application, etc., and a back end system can be a serving end of the browser, a back end of the client of the application, a serving end of the application, etc.

In actual application, when input information on a page of the front end is checked, there are two scenarios. In the first scenario, for a first set of input information, when a user inputs the information, the front end can directly check the input information. Thus, when the front end determines that the user inputs erroneous input information, the user can be prompted in real time to correct the erroneous input information. As such, the user does not need to manually search for the erroneous input information, and the erroneous input information is less likely to be missed. In the second scenario, a second set of input information is not to be checked (e.g., cannot be checked) by the front end, the front end submits the second set of input information to the back end, and the back end performs check, and then returns a check result to the front end. In this situation, the front end can determine erroneous input information based on the check result returned by the back end, and provide a prompt of the erroneous input information for the user by using the method in the existing technology. Consequently, the user needs to search the page for the erroneous input information that is prompted. Particularly, when the page is relatively long and there is much erroneous input information on the page, the user needs to scroll up or down the page to identify the erroneous input information. The operations are complex, and the erroneous input information can be easily missed.

The problem mentioned in the background of the present application is mainly generated in the second scenario or in a hybrid of the two scenarios. The page positioning method for erroneous input information that is provided in the implementations of the present application can be used to resolve the problem. For ease of description, the following mainly describes the method based on the second scenario.

Figure 1:
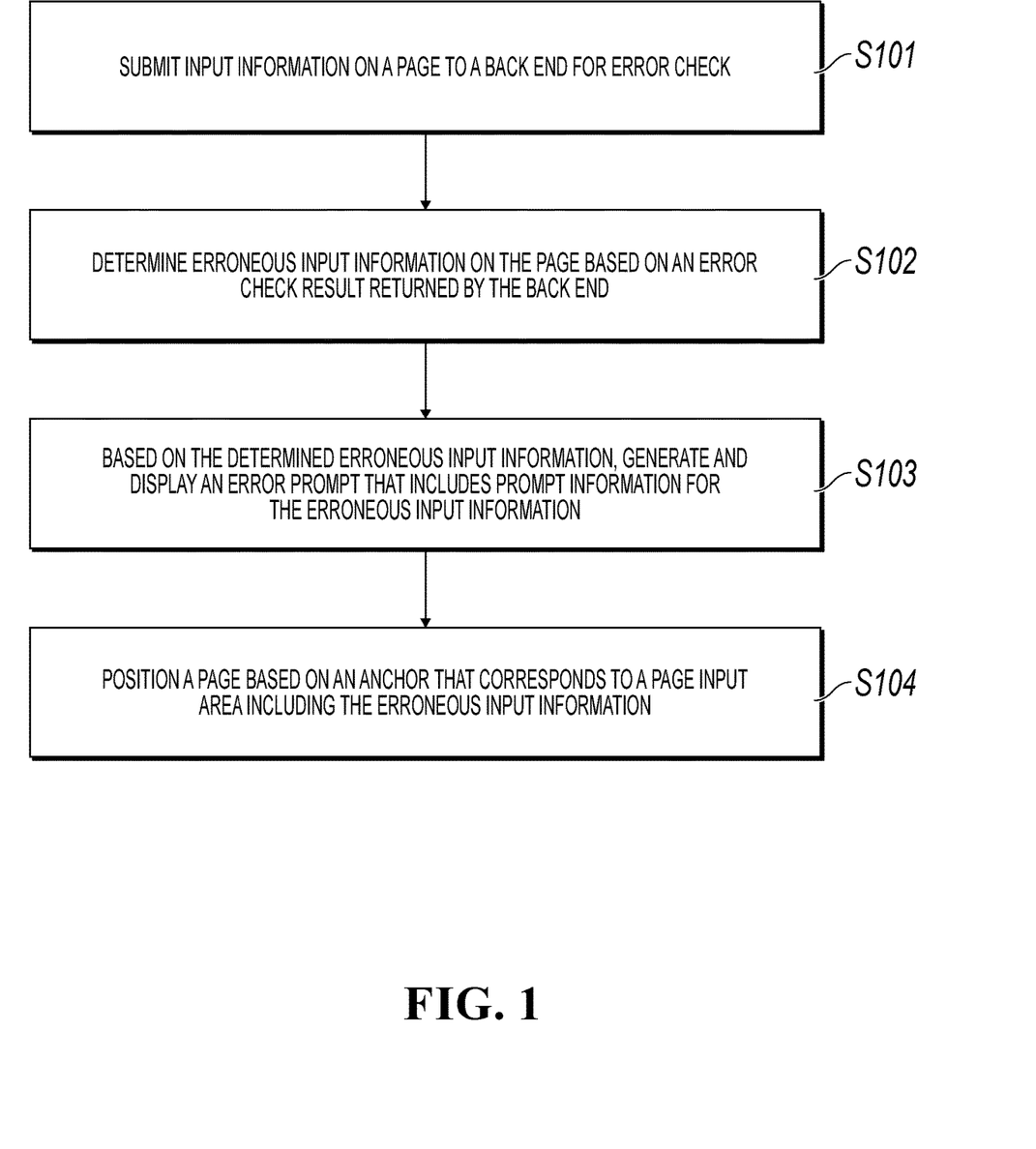
FIG. 1 illustrates a process of a page positioning method for erroneous input information according to an implementation of the present application.

FIG. 1 shows a process of a page positioning method for erroneous input information according to an implementation of the present application. A page can be generated and displayed by a front end. The process can be performed by the front end or a device including the front end, for example, a terminal. The terminal includes but is not limited to a personal computer, a mobile phone, a tablet computer, a smartwatch, and an in-vehicle mobile station. An execution body does not constitute a limitation on the present application. For ease of description in the present application, the front end system serves as the execution body.

The process in FIG. 1 can include the steps below.

S101. Submit input information on a page to a back end for error check.

The page can be a web page, a page of an application, etc. The page can include one or more input controls, including but not limited to: an input text box, an input drop box, a selectable control, etc. An area that is provided by the input control on the page and that can be used by the user to perform an input operation can be referred to as a page input area. Each input control can provide one or more page input areas.

Generally, each page input area can correspond to one field, and the field can be used to prompt the user to input information on a page input area that corresponds to the field.

The back end can separately perform error check on the input information submitted by the front end based on a preset check rule.

The error check can be checking whether the input information is input in a designated format. For example, assume that a number should be input for a certain field, if the input information that corresponds to the field actually includes a letter, the back end can determine that the input information is erroneous and cannot pass the check. The error check can be checking, based on predetermined service logic, whether input information conflicts with other input information that passes the check. For example, assume that input information that corresponds to a field A and a field B passes the check and input information that is input for a field C should fall, based on the predetermined service logic, within a value interval formed by the input information that corresponds to the field A and the field B, if the input information that corresponds to the field C actually does not fall within the value interval, the back end can determine that the input information that corresponds to the field C is erroneous and cannot pass the check.

S102. Determine erroneous input information on the page based on an error check result returned by the back end.

In this implementation of the present application, input information that is submitted by the front end and that does not pass the check performed by the back end can be referred to as the erroneous input information. Based on the error check result returned by the back end, the front end can determine the erroneous input information on the page. For ease of description, a field that corresponds to the erroneous input information can be referred to as an erroneous field. Determining the erroneous input information on the page can also be determining the erroneous field on the page. It should be noted that in actual application, the back end can directly return each erroneous field, and the front end can directly determine the erroneous input information on the page based on each erroneous field.

In addition, the back end can return, to the front end, information recording a reason why the input information that corresponds to each erroneous field does not pass the check, so as to help the front end provide more prompt information for the user.

S103. Based on the determined erroneous input information, generate and display an error prompt popup that includes prompt information for the erroneous input information.

In this implementation of the present application, the error prompt popup can float on the page. A position of the error prompt popup can be fixed relative to a display screen, so that the error prompt popup does not move when the page is scrolled up or down. In this situation, when the page is displayed on the display screen, the user can constantly see the error prompt popup on the display screen, so that it is more convenient for the user to view and correct the erroneous input information. In this implementation of the present application, the display position of the error prompt popup on the display screen is not limited. In actual application, the error prompt popup can be displayed in a relatively eye-catching position, so as to help the user see the error prompt popup; or the error prompt popup can be arranged to cover minimum original content on the page, so as to help the user view the original content on the page.

In this implementation of the present application, the error prompt popup can be used for at least one of the following two purposes. The following separately describes the two purposes.

The first purpose: The error prompt popup can be used to provide a prompt information of erroneous input information on the page. A prompt method can be displaying the erroneous input information in the error prompt popup or displaying a name of the field (that is, the erroneous field) that corresponds to the erroneous input information. Content of the prompt popup can be included in a name of an anchor link, or can be independent of the anchor link and be included in the error prompt popup.

The second purpose: The error prompt popup can be used to display an anchor link of an anchor that corresponds to a page input area including the erroneous input information. The user can click the anchor link to enable the front end to position the page at the page area including the erroneous input information, so that the user can conveniently view and correct the erroneous input information.

Further, the error prompt popup can be a static popup, or can be a dynamic popup that can vary as the page changes. When the error prompt popup is a dynamic popup, the front end can change, based on a correction operation and a storage operation that are performed by the user on the erroneous input information, the content included in the error prompt popup, so as to improve practicability and validity of the error prompt popup in the present application.

In this implementation of the present application, positioning the page at a certain area on the page can be such an action: determining whether the area is displayed in a set position of the current display area (the set position can usually be a relatively eye-catching position in the current display area, for example, the top or the middle of the current display area). If yes, the page is not scrolled; otherwise, the page is scrolled until the area is displayed in the set position of the current display area, and then scrolling of the page is stopped. It can be seen that after the page is positioned at the area on the page, the user can easily see the area and content in the area without scrolling the page.

S104. Position a page based on an anchor that corresponds to a page input area including the erroneous input information.

In this implementation of the present application, a sequence of performing step S103 and step S104 is not limited. S103 can be performed before S104, S104 can be performed before S103, or S104 and S103 can be performed simultaneously.

In this implementation of the present application, each anchor can be predetermined before step S101 is performed, or can be set in a process of performing steps S101 to S104. This implementation of the present application sets no limitation on a setting moment of each anchor.

After obtaining each anchor, the front end can automatically position the page at a page input area that corresponds to any anchor and that includes the erroneous input information. Thus, the user can conveniently see and correct the erroneous input information on the page without a need to manually search for the erroneous input information on the page.

Similarly, the front end can sequentially and separately position, based on the predetermined rule and anchors, the page at page input areas that correspond to the anchors and that include the erroneous input information. Accordingly, the user can sequentially correct all the erroneous input information on the page. As such, the erroneous input information are less likely to be missed.

Based on the above method, the user can learn that there is erroneous input information on the page by using the error prompt popup. Also, the page can be positioned at the page input area including the erroneous input information based on the anchor, so as to help the user correct the erroneous input information. As such, operations of the user can be simplified, and the erroneous input information are less likely to be missed, so that the problem mentioned in the background of the present application is resolved.

For ease of understanding, the following further describes the steps in FIG. 1.

In this implementation of the present application, when the error prompt popup is used for the above mentioned first purpose, the prompt information, which is included in the error prompt popup, for the erroneous input information can be a field name (that is, an erroneous field name) that corresponds to the erroneous input information.

In this situation, for step S103, generating the error prompt popup that includes the prompt information for the erroneous input information can include: determining a field name (that is, the erroneous field name) that corresponds to the erroneous input information; and generating an error prompt popup that includes each field name, where each field name is displayed in the error prompt popup after splicing is performed by using a set splicing method. This implementation of the present application sets no limitation on the splicing method, and the splicing method can be sequentially splicing erroneous field names from top to bottom, from left to right, etc. based on a sequence of the erroneous field names on the page. Certainly, in addition to the erroneous field name, the prompt information in the error prompt popup can include other information, for example, the total number of the erroneous fields and error cause description information that corresponds to the erroneous field. For ease of understanding, FIG. 2 is used as an example for description.

Figure 2:
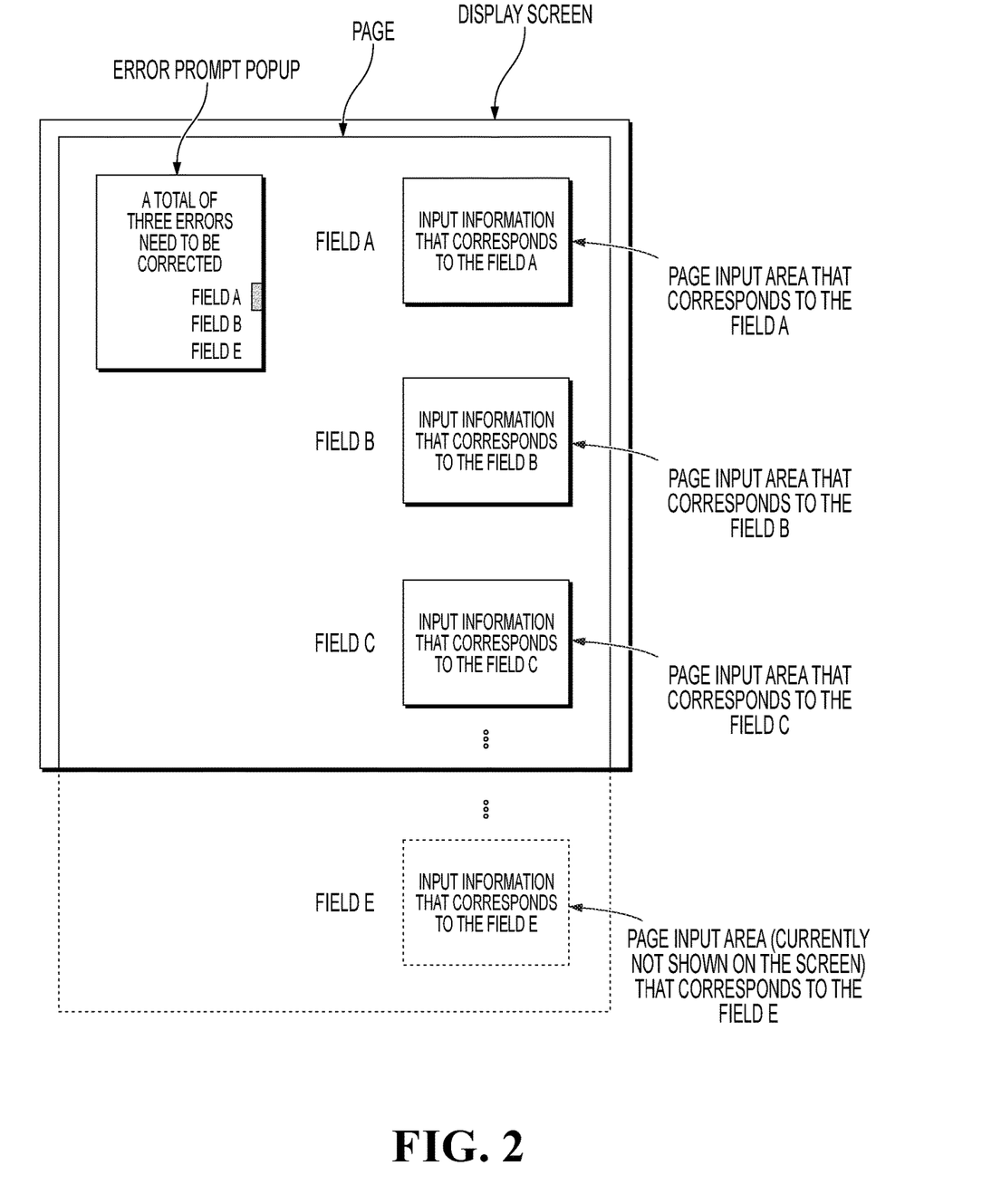
FIG. 2 is a schematic diagram illustrating an error prompt popup displayed on a page in an example application according to an implementation of the present application.

FIG. 2 is a schematic diagram illustrating an error prompt popup displayed on a page in actual application according to an implementation of the present application.

It can be seen that prompt information included in the error prompt popup in FIG. 2 includes the total number of erroneous fields on the page and each erroneous field name. In the error prompt popup, "a total of three errors need to be corrected", that is, a total of three erroneous fields are prompted. Further, the error prompt popup displays names of the three erroneous fields: a "field A", a "field B", and a "field E" in a splicing way from top to bottom. Only a part of the page is currently displayed on the display screen, and an input area that corresponds to the field E is invisible. In actual application, when the page is, for example, a long page in FIG. 2, it is possible that a greater number of erroneous fields cannot be simultaneously displayed in the current display screen, which is also one of reasons why it is inconvenient for the user to identify the erroneous input information in the existing technology and the erroneous input information can be easily missed.

In this implementation of the present application, a prompt of the erroneous input information can be provided for the user by using the error prompt popup. Further, the page can be automatically positioned, by using an anchor positioning method, at the page input area including the erroneous input information. Based on such an idea, for step S104, positioning the page based on the anchor that corresponds to the page input area including the erroneous input information can include: positioning the page at a page input area based on an anchor that corresponds to a page input area including predetermined erroneous input information in all the erroneous input information; and each time when a storage instruction for corrected erroneous input information on the page is received, storing the corrected erroneous input information, and positioning the page at a page input area based on an anchor that corresponds to a page input area including predetermined erroneous input information that is to be corrected, until all erroneous input information on the page is corrected and stored.

This implementation of the present application sets no limitation on a sequence of separately positioning the page at page input areas including the erroneous input information. In conclusion, after step S102 is performed, the page can be first automatically positioned at a page input area (in the present application, assume that the positioning operation can enable the page input area to be displayed on the top of the display screen) including a piece of erroneous input information. After the user corrects and stores the erroneous input information on the page area, the page is automatically positioned at a page input area including another piece of erroneous input information. As such, the user can sequentially correct all the erroneous input information on the page as the page is automatically positioned, without a need to manually search for the erroneous input information on the page.

In actual application, because the user usually first starts to input information at the top of the page and sequentially inputs information in page input areas on the page from top to bottom, when step S104 is performed, each page can also be positioned at the page area including the erroneous input information based on a sequence of the erroneous input information on the page. This better conforms to users' habit of inputting or correcting information on the page.

In addition, after positioning the page each time, the front end can provide a prompt of a page area that the page is currently positioned at and that includes erroneous input information corresponding to an erroneous field for the user by using the error prompt popup. In FIG. 2, the page is positioned at the page area including the erroneous input information that corresponds to the field A. Accordingly, in FIG. 2, compared with other fields, there is a mark (black rectangle) beside the field A in the error prompt popup. The mark is used to prompt that that page is currently positioned at the page area that includes the erroneous input information corresponding to the field A. Certainly, the mark is merely an example of the prompt, and the prompt can be further implemented in another method. This is not limited in this implementation of the present application.

In this implementation of the present application, when the user wants to store the corrected erroneous input information after correcting any erroneous input information, the storage instruction can be sent by using a storage control provided on an operating page. It should be noted that if the corrected erroneous input information is only stored, the back end is not triggered to check the corrected erroneous input information. As such, after correcting and storing all the erroneous input information, the user can perform error check after the front end submits the modified erroneous input information to the back end.

For ease of understanding, based on the detailed description of step S104, the example in FIG. 2 is still used below to illustrate a rendering diagram of a page in a process of implementing step S104.

In FIG. 2, the front end generates the error prompt popup and displays the generated error prompt popup, and the front end positions the page at a page area including the erroneous input information that corresponds to the field A. Further, after the user corrects the erroneous input information that corresponds to the field A, the page can be positioned at a page area including the erroneous input information that corresponds to the second erroneous field (the field B), as shown in FIG. 3.

Figure 3:
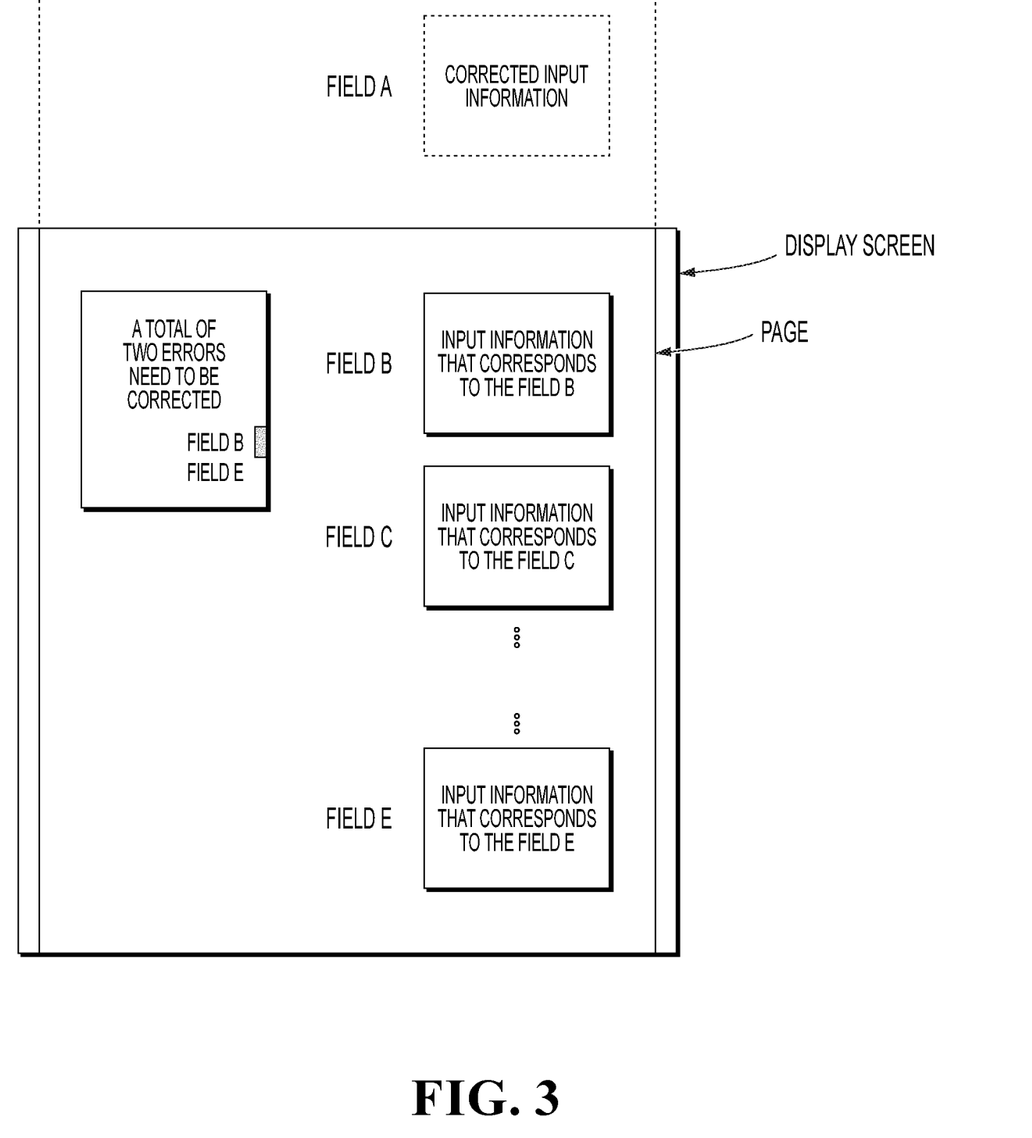
FIG. 3 is a schematic diagram illustrating a page obtained after a first piece of erroneous input information in FIG. 2 is corrected and stored according to an implementation of the present application.
Figure 4:
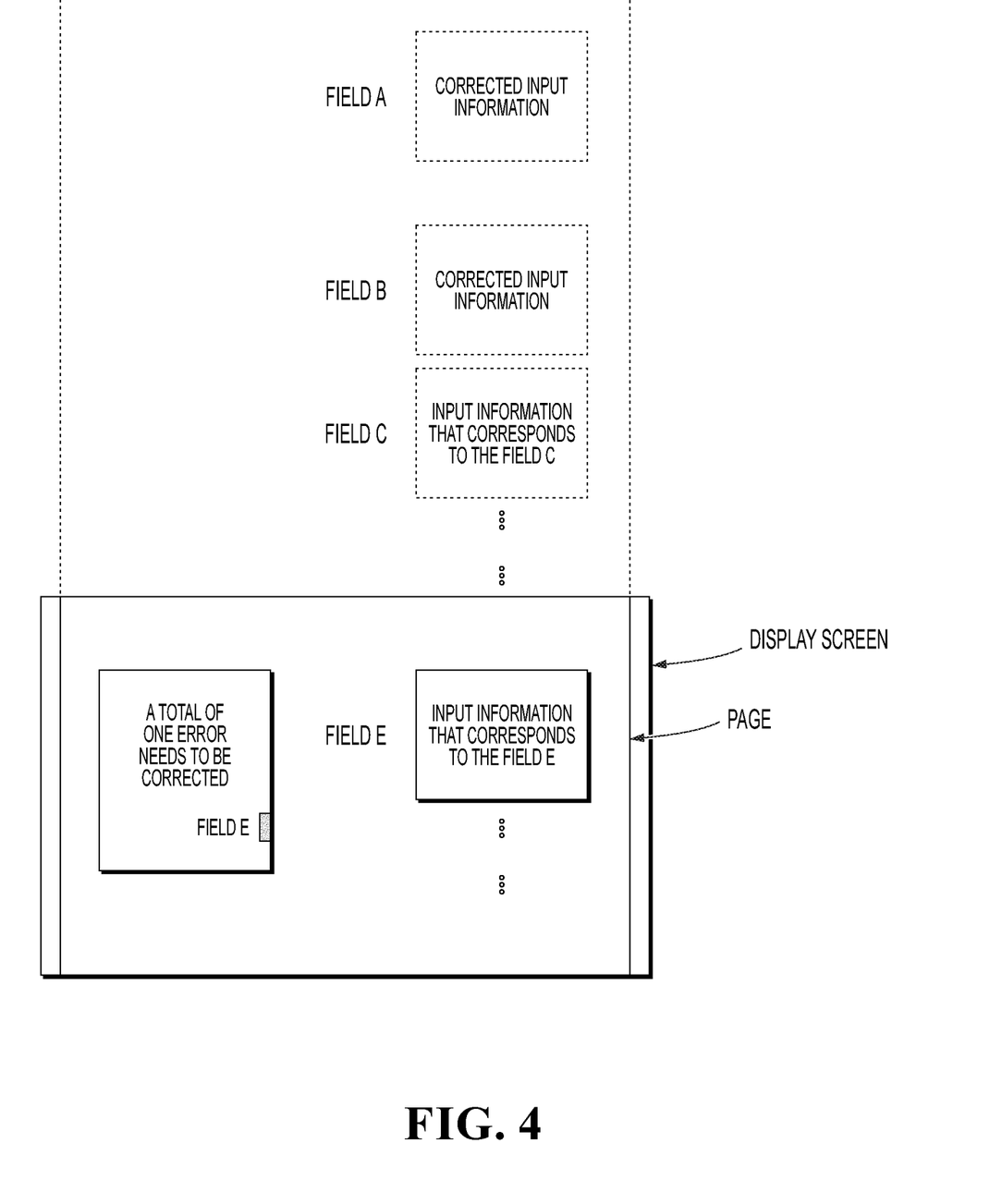
FIG. 4 is a schematic diagram illustrating a page obtained after a second piece of erroneous input information in FIG. 2 is corrected and stored according to an implementation of the present application.

In FIG. 3, the page is positioned at the page area including the erroneous input information that corresponds to the field B. Further, after the user corrects the erroneous input information that corresponds to the field B, the page can be positioned at a page area including the erroneous input information that corresponds to the third erroneous field (the field E), as shown in FIG. 4.

Figure 5:
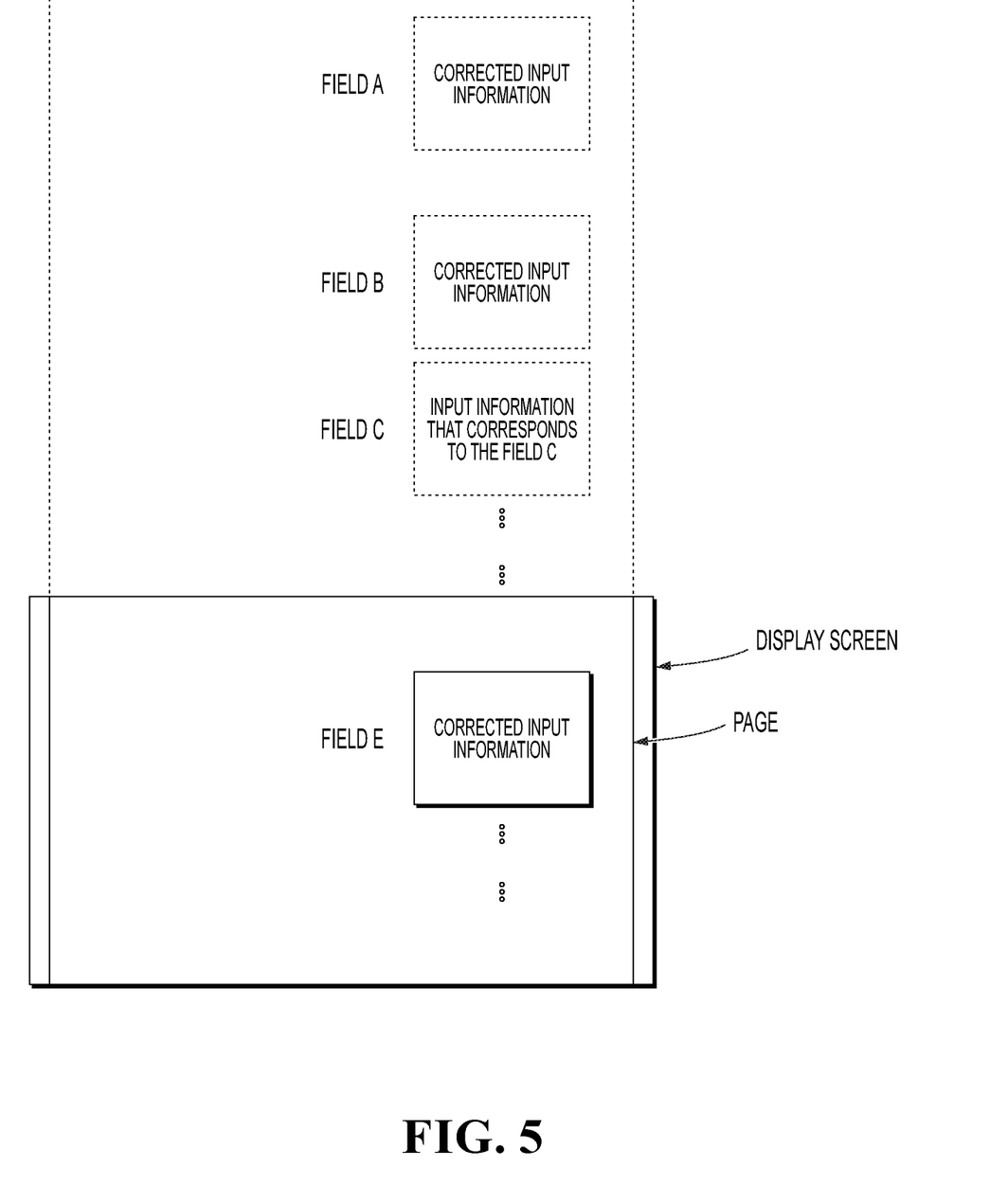
FIG. 5 is a schematic diagram illustrating a page obtained after all erroneous input information in FIG. 2 is corrected and stored according to an implementation of the present application.

Further, after the user corrects the erroneous input information that corresponds to the field E, all erroneous input information on the page is corrected and stored. As such, the error prompt popup can be destroyed, as shown in FIG. 5. The user can instruct the front end to submit the modified input information on the page in FIG. 5 to the back end for further error check.

In this implementation of the present application, as mentioned above, when the error prompt popup is a dynamic popup, the front end can change the content included in the error prompt popup based on a correction operation and a storage operation that are performed by the user on the erroneous input information. Based on such an idea, after the step "store the corrected erroneous input information" in the specific implementation of the step S104 is performed, the following step can be further performed: hide or destroy prompt information that is included in the error prompt popup and that corresponds to the corrected erroneous input information. As such, the error prompt popup can display, in real time, only erroneous input information that is not corrected and stored by the user, and does not display the erroneous input information that has been corrected and stored by the user.

Further, when it is determined that all the prompt information for all the erroneous input information included in the error prompt popup is hidden or destroyed, it can be considered that the error prompt popup is no longer needed. As such, the error prompt popup can be destroyed, so as to prevent the error prompt popup from hindering a subsequent operation of the user.

The above mentioned page positioning operations can be automatically performed by the front end. In actual application, the user probably also wants to position the page at a designated page input area including certain erroneous input information prompted on the page. To satisfy this requirement of the user, in this implementation of the present application, the prompt information, which is included in the error prompt popup generated in step S102, for the erroneous input information can further include: an anchor link of an anchor that corresponds to the page input area including the erroneous input information.

Further, after the error prompt popup that includes the anchor link is generated and displayed, the user can click any anchor link in the error prompt popup. Accordingly, when detecting a click operation for the anchor link, the front end can position the page at the page input area that corresponds to the anchor link, so as to help the user correct the erroneous input information on the page input area. As such, the user can more flexibly perform the operation, and applicability of the present application can be improved. In addition, the erroneous field name can be used as a name of the anchor link that corresponds to the erroneous field, so that each anchor link that is named after a corresponding erroneous field to provide a prompt of the erroneous field for the user. In addition, the user can easily click the anchor link to position the page, and no additional information is required in the error prompt popup.

The page positioning method for erroneous input information that is provided in this implementation of the present application is applicable to a short page and a long page. A long page refers to a page whose length is greater than a length of a display area used to display the long page. When the method is applied to the long page, an advantage of the method compared with the existing technology can be better reflected.

The page positioning method for erroneous input information that is provided in implementations of the present application is described above. Based on a same idea, the implementations of the present application further provide a corresponding page positioning apparatus for erroneous input information, as shown in FIG. 6.

Figure 6:
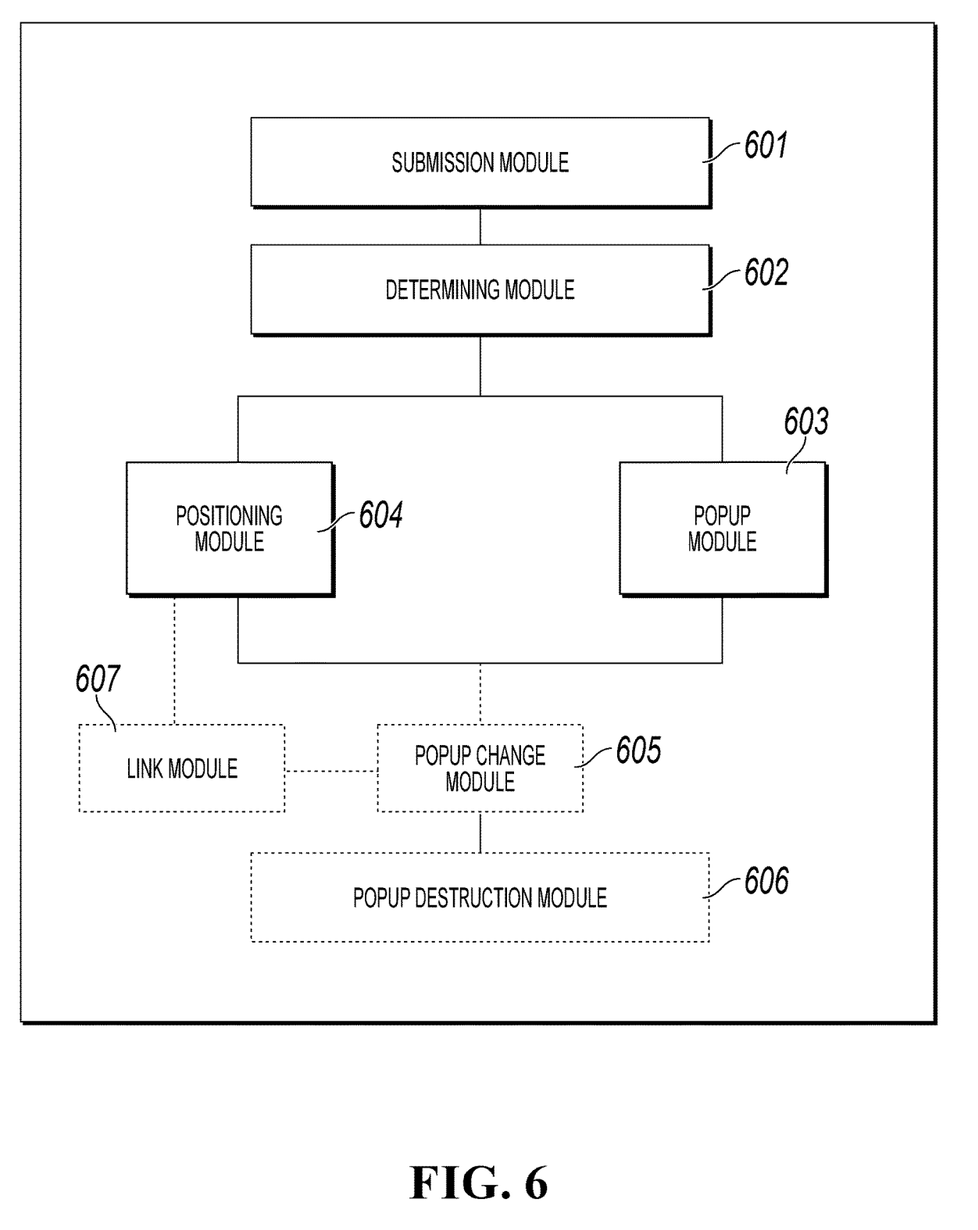
FIG. 6 is a schematic structural diagram illustrating a page positioning apparatus for erroneous input information according to an implementation of the present application.

FIG. 6 is a schematic structural diagram illustrating a page positioning apparatus for erroneous input information according to an implementation of the present application. The apparatus includes the following: a submission module 601, configured to submit input information on a page to a back end for error check; a determining module 602, configured to determine erroneous input information on the page based on an error check result returned by the back end; a popup module 603, configured to generate and display an error prompt popup that includes prompt information for the erroneous input information based on the determined erroneous input information; and a positioning module 604, configured to position a page based on an anchor that corresponds to a page input area including the erroneous input information.

The prompt information of the erroneous input information includes a field name that corresponds to the erroneous input information; and the popup module 603 is specifically configured to determine a field name that corresponds to the erroneous input information and to generate an error prompt popup that includes each field name, where each field name is displayed in the error prompt popup after splicing is performed by using a set splicing method.

The positioning module 604 is specifically configured to position the page at a page input area based on an anchor that corresponds to a page input area including predetermined erroneous input information in all the erroneous input information. Each time when a storage instruction for corrected erroneous input information on the page is received, the module is configured to store the corrected erroneous input information and to position the page at a page input area based on an anchor that corresponds to a page input area including predetermined erroneous input information, until all erroneous input information on the page is corrected and stored.

The apparatus can further include: a popup change module 605, configured to hide or destroy prompt information that is included in the error prompt popup and that corresponds to the corrected erroneous input information after the positioning module 604 stores the corrected erroneous input information.

The apparatus can further include: a popup destruction module 606, configured to destroy the error prompt popup when it is determined that all the error prompt popup contain prompt information for the erroneous input information is hidden or destroyed.

The prompt information of the erroneous input information further includes an anchor link of the anchor that corresponds to the page input area including the erroneous input information, and the apparatus can further include: a link module 607, configured to position the page at a page input area that corresponds to the anchor link when a click operation for an anchor link included in the error prompt popup is detected.

The page can be a long page, and a length of the long page is greater than a length of a display area used to display the long page.

The apparatus shown in FIG. 6 can be disposed on the front end or any device including the front end.

Based on the apparatus, the user can learn that there is erroneous input information on the page by using the error prompt popup. Also, the page can be positioned at the page input area including the erroneous input information based on the anchor, so as to help the user correct the erroneous input information. As such, operations of the user can be simplified, and the erroneous input information are less likely to be missed.

A person skilled in the art should understand that the implementations of the present disclosure can be provided as a method, a system, or a computer program product. As such, the present disclosure can use a form of hardware only implementations, software only implementations, or implementations with a combination of software and hardware. In addition, the present disclosure can use a form of a computer program product implemented on one or more computer-usable storage media (including but not limited to a magnetic disk memory, a CD-ROM, an optical memory, etc.) that include computer-usable program code.

The present disclosure is described with reference to the flowcharts and/or block diagrams of the method, the device (system), and the computer program product based on the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a processor of a general-purpose computer, a dedicated computer, an embedded processor, or any other programmable data processing device to generate a machine, so that the instructions are executed by a processor of a computer or any other programmable data processing device to generate an apparatus for implementing a designated function in one or more processes in the flowcharts and/or in one or more blocks in the block diagrams.

These computer program instructions can also be stored in a computer readable memory that can instruct the computer or another programmable data processing device to work in a particular way, so that the instructions stored in the computer readable memory are used to generate a product that includes an instruction apparatus. The instruction apparatus implements a designated function in one or more processes in the flowcharts and/or in one or more blocks in the block diagrams.

These computer program instructions can also be loaded into the computer or another programmable data processing device, so that a series of operations and steps are performed on the computer or another programmable device to generate computer-implemented processing. As such, the instructions executed on the computer or another programmable device provide steps for implementing a designated function in one or more processes in the flowcharts and/or in one or more blocks in the block diagrams.

In a typical configuration, a computing device includes one or more processors (CPU), an input/output interface, a network interface, and a memory.

The memory can include a non-persistent memory, a random access memory (RAM), a non-volatile memory, and/or another form that are/is in a computer readable medium, for example, a read-only memory (ROM) or a flash memory. The memory is an example of the computer readable medium.

The computer readable media include persistent media, non-persistent media, movable media, and unmovable media that can store information through any method or technology. The information can be a computer readable instruction, a data structure, a program module, or other data. Examples of the computer storage medium include but are not limited to a parameter random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory storage device, a compact disc read-only memory (CD-ROM), a digital versatile disc (DVD), or another optical storage, a cassette, a magnetic disk, or another magnetic storage device or any other non-transmission medium. The computer storage medium can be configured to store information that can be accessed by a computing device. Based on a definition in this specification, the computer readable medium does not include computer-readable transitory media (transitory media) such as a modulated data signal and a carrier.

It should be further noted that the term "include", "contain", or any other variant thereof is intended to cover non-exclusive inclusion, so that a process, a method, a commodity, or a device that includes a series of elements not only includes those elements but also includes other elements that are not expressly listed, or further includes elements inherent to such a process, method, commodity, or device. An element described with "includes a . . . " does not, without more constraints, preclude the existence of additional identical elements in the process, method, product, or device that includes the element.

The above implementations are merely implementations of the present application, and are not intended to limit the present application. A person skilled in the art can make various modifications and changes to the present application. Any modification, equivalent replacement, improvement, etc. made without departing from the spirit and principle of the present application shall fall within the scope of the claims of the present application.

Figure 7:
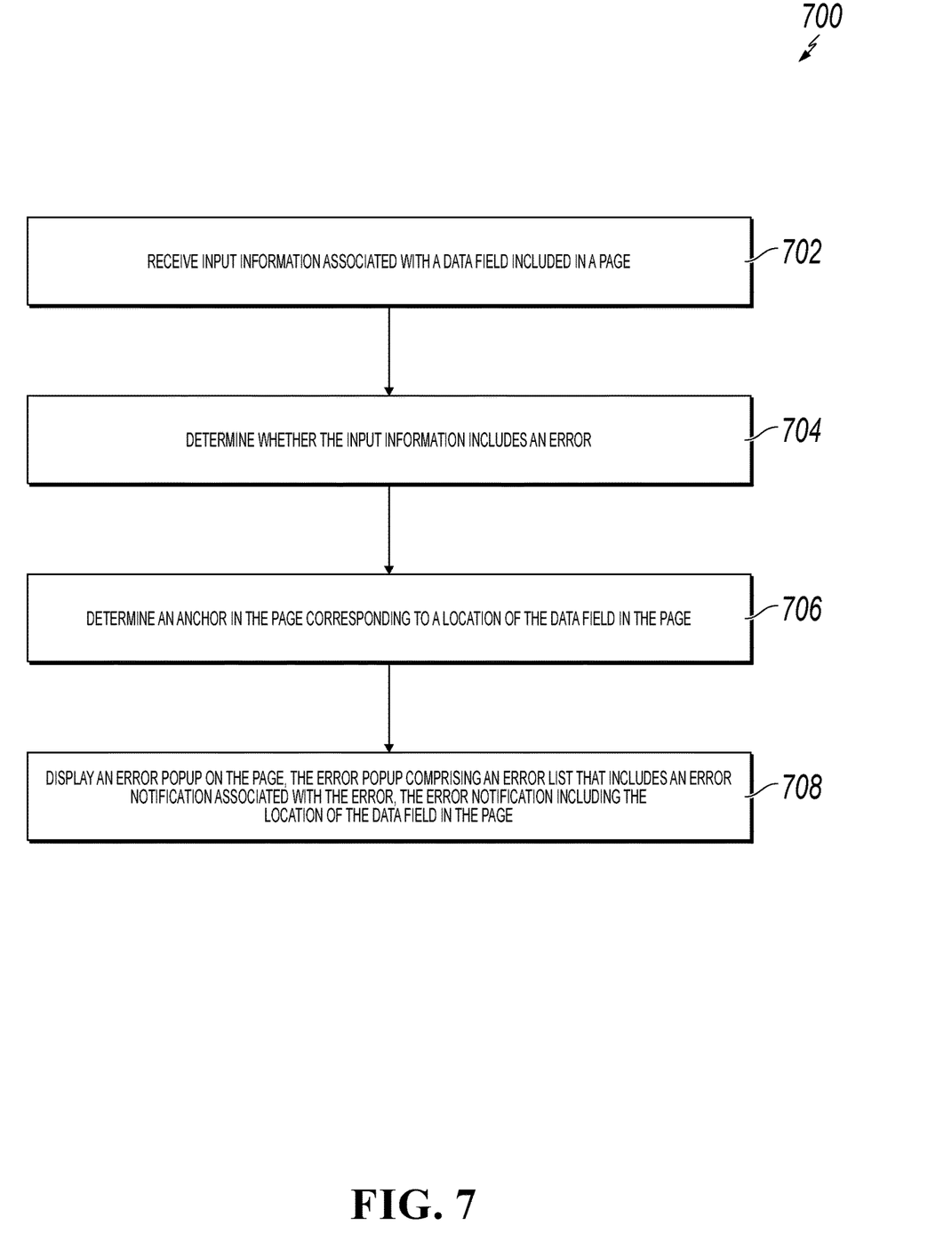
FIG. 7 is a flowchart illustrating an example of a computer-implemented method for navigating erroneous data fields in a page, according to an implementation of the present disclosure.

FIG. 7 is a flowchart illustrating an example of a computer-implemented method 700 for navigating erroneous data fields in a page, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, input information associated with a data field included in a page is received. From 702, method 700 proceeds to 704. At 704, a determination is made whether the input information includes an error. In some cases, this determination includes transmitting the input information to a back end system to be checked for errors; and receiving an error check result from the back end system, the error check result including the error associated with the input information. From 704, method 700 proceeds to 706.

At 706, in response to determining that the input information includes an error, an anchor in the page corresponding to a location of the data field in the page is determined. From 706, method 700 proceeds to 708. At 708, an error popup is displayed on the page, the error popup comprising an error list that includes an error notification associated with the error, the error notification including the location of the data field in the page. In some cases, the error notification is identified by a field name identifying the data field. The error notification may be identified by an anchor link associated with the anchor. In some implementations, a user selection of the anchor link in the error popup is received, and in response to receiving the user selection, the location of the data field in the page is jumped to based on the anchor. Jumping to the data field can be performed by the frontend system, for example, to display the portion of the page that includes the data field. In some implementations, the error list in the error popup has multiple error notification and the frontend system jumps to the location of the first data field because the first error notification is the top error on the error list. In some cases, the error popup includes a number of error notifications based on a number of data fields that are to be corrected. In some instances, an indicator in the error list distinguishes the error notification from other error notifications in the error list. From 708, method 700 may stop.

In some implementations, the input information is a first input information, the data field is a first data field, the error is a first error, and the error list in the error popup includes a second error notification associated with a second error, the second error associated with second input information for a second data field. In some cases, a correction input for the data field may be received, and the error notification may be removed from the error list in the error popup.

In some cases, the error popup can be similar to the error popup depicted in FIG. 2. Each of the first and/or the second error notifications can include a field name corresponding to the respective data field. For example, the first error notification can include an identifier (e.g., a name or a code) associated with the first data field. Each of the first and/or the second error notifications can include an anchor link associated with the location of the respective data field. An anchor link can be provided based on a respective anchor determined in 706. For example, the error notification can include an anchor link that when selected causes a page jump to the location of the data field based on the anchor. In some implementations, the error popup includes the number of error notifications. The number of error notifications can be determined based on the number of errors received from the backend system, or based on the number of data fields that are to be corrected (e.g., the number of error notification on the error list). For example, the error popup depicted in FIG. 2 specifies three as the number of errors (or the number of data fields A, B, and C) that are to be corrected on the page.

In some implementations, one or more of the error notifications are selectable. In these implementations, upon receiving a selection of an error notification, the frontend system performs a page jump to a data field associated with the selected error notification regardless of the order of error notifications on the error list.

In some implementations, a current error notification associated with the data field that is currently jumped to can be distinguished from other error notifications in the error list by a mark. For example, the current error notification can be highlighted, or marked with a text or a symbol next to the error notification.

The error popup can include a page indicator that indicates the currently displayed portion of the page relative to the overall page. The page indicator in FIG. 3 is presented by a black rectangle, but is not limited to such presentations.

Information associated with one or more data fields on a page can be received at a front end system (also referred to as "frontend" herein) and analyzed for accuracy and/or compliance with one or more rules in a back end system (also referred to as "backend" herein). For example, the frontend system may receive the information from a user and transmit it to the backend system for error check. Based on one or more rules (e.g., the rules can include form or number of characters that can be used in a respective data field) the backend system may send a list of the errors to the frontend system. The frontend system determines the data fields associated with the errors and prompts the user to correct the respective erroneous data fields. Conventionally, the frontend marks the data fields that need to be corrected by text or symbolic remarks. However, such marks can cause difficulties and complexities in navigating the erroneous data fields. These complexities can lead to an undesired user experience, as well as, a waste of resources (e.g., bandwidth, time, etc.) that have been dedicated to receiving the input information. In addition and particularly in long pages, the erroneous data fields can be easily missed.

The present disclosure provides techniques to improve navigation of the data fields that need to be corrected (i.e., erroneous data fields). According to the implementations of the present disclosure, the frontend system provides a popup page that lists the errors received from the backend system. The frontend system also performs page jumps to the erroneous data fields associated with the errors listed in the popup page, to cover the errors one by one. Accordingly, compared to the conventional methods, the errors can be easily navigated and are less likely to be missed. In addition, an error associated with an erroneous data field that is currently jumped to can be marked (e.g., highlighted) in the popup page so that the user can have a better idea about which fields of the page have been corrected and/or which fields still need to be corrected.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method executed by one or more processors, the method comprising:
   receiving, by the one or more processors, first input information associated with a first data field and second input information associated with a second data field, wherein the first data field and the second data field are included in a page;
   determining, by the one or more processors, that the first input information comprises a first error based on a corresponding designated format or a corresponding conflict with other input information that passes a first check, and that the second input information comprises a second error based on a corresponding designated format or a corresponding conflict with other input information that passes a second check;
   in response to determining that the first input information comprises the first error and the second input information comprises the second error, determining, by the one or more processors, a location of the first data field and a location of the second data field in the page;
   generating, by the one or more processors, a first anchor link corresponding to the location of the first data field in the page, and a second anchor link corresponding to the location of the second data field in the page;
   displaying, by the one or more processors, an error popup on the page, the error popup comprising an error list that comprises a first error notification associated with the first error and a second error notification associated with the second error, wherein an indicator in the error list distinguishes the first error notification from the second error notification in the error list, before the first error notification is removed, wherein the first error notification comprises the first anchor link corresponding to the location of the first data field in the page, and wherein the second error notification comprises the second anchor link corresponding to the location of the second data field in the page;
   receiving, by the one or more processors, a first correction input to correct the first error;
   correcting the first error based on the first correction input;
   in response to correcting the first error, removing, by the one or more processors, the first error notification from the error list in the error popup; and
   positioning, by the one or more processors, the page at the second data field in the page to receive a second correction input to correct the second error.

2. The computer-implemented method of claim 1, further comprising:
   receiving a user selection of the first anchor link in the error popup; and
   in response to receiving the user selection, jumping to the location of the first data field in the page.

3. The computer-implemented method of claim 1, wherein the error popup includes a number of error notifications based on a number of data fields that are to be corrected.

4. The computer-implemented method of claim 1, wherein determining that the first input information comprises the first error comprises:
   transmitting, by the one or more processors, the first input information to a back end system to be checked for errors; and
   receiving, by the one or more processors, an error check result from the back end system, the error check result including the first error associated with the first input information.

5. A non-transitory, computer-readable medium storing one or more instructions executable by a computer system to perform operations comprising:

receiving first input information associated with a first data field and second input information associated with a second data field, wherein the first data field and the second data field are included in a page;

determining that the first input information comprises a first error based on a corresponding designated format or a corresponding conflict with other input information that passes a first check, and that the second input information comprises a second error based on a corresponding designated format or a corresponding conflict with other input information that passes a second check;

in response to determining that the first input information comprises the first error and the second input information comprises the second error, determining a location of the first data field and a location of the second data field in the page;

generating a first anchor link corresponding to the location of the first data field in the page, and a second anchor link corresponding to the location of the second data field in the page;

displaying an error popup on the page, the error popup comprising an error list that comprises a first error notification associated with the first error and a second error notification associated with the second error, wherein an indicator in the error list distinguishes the first error notification from the second error notification in the error list, before the first error notification is removed, wherein the first error notification comprises the first anchor link corresponding to the location of the first data field in the page, and wherein the second error notification comprises the second anchor link corresponding to the location of the second data field in the page;

receiving a first correction input to correct the first error;

correcting the first error based on the first correction input;

in response to correcting the first error, removing the first error notification from the error list in the error popup; and positioning the page at the second data field in the page to receive a second correction input to correct the second error.

6. The non-transitory, computer-readable medium of claim 5, wherein the operations further comprise:
receiving a user selection of the first anchor link in the error popup; and
in response to receiving the user selection, jumping to the location of the first data field in the page.

7. The non-transitory, computer-readable medium of claim 5, wherein the error popup includes a number of error notifications based on a number of data fields that are to be corrected.

8. The non-transitory, computer-readable medium of claim 5, wherein determining that the first input information comprises the first error comprises:

transmitting the first input information to a back end system to be checked for errors; and
receiving an error check result from the back end system, the error check result including the first error associated with the first input information.

9. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

receiving first input information associated with a first data field and second input information associated with a second data field, wherein the first data field and the second data field are included in a page;

determining that the first input information comprises a first error based on a corresponding designated format or a corresponding conflict with other input information that passes a first check, and that the second input information comprises a second error based on a corresponding designated format or a corresponding conflict with other input information that passes a second check;

in response to determining that the first input information comprises the first error and the second input information comprises the second error, determining a location of the first data field and a location of the second data field in the page;

generating a first anchor link corresponding to the location of the first data field in the page, and a second anchor link corresponding to the location of the second data field in the page;

displaying an error popup on the page, the error popup comprising an error list that comprises a first error notification associated with the first error and a second error notification associated with the second error, wherein an indicator in the error list distinguishes the first error notification from the second error notification in the error list, before the first error notification is removed, wherein the first error notification comprises the first anchor link corresponding to the location of the first data field in the page, and wherein the second error notification comprises the second anchor link corresponding to the location of the second data field in the page;

receiving a first correction input to correct the first error;

correcting the first error based on the first correction input;

in response to correcting the first error, removing the first error notification from the error list in the error popup; and positioning the page at the second data field in the page to receive a second correction input to correct the second error.

* * * * *

UNITED STATES PATENT AND TRADEMARK OFFICE
CERTIFICATE OF CORRECTION

PATENT NO. : 10,831,344 B2  
APPLICATION NO. : 16/027030  
DATED : November 10, 2020  
INVENTOR(S) : Bin Liu, Junliang Zhang and Lei Hong Page 1 of 1

It is certified that error appears in the above-identified patent and that said Letters Patent is hereby corrected as shown below:

On the Title Page

Column 1 (Inventors), Line 2, delete "Hanzghou" and insert -- Hangzhou --, therefor.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*